United States Patent [19]

Flaten

[11] Patent Number: 4,573,837
[45] Date of Patent: Mar. 4, 1986

[54] LONGITUDINAL FEED ATTACHMENT FOR A BORING BAR

[75] Inventor: James F. Flaten, Burnsville, Minn.

[73] Assignee: Tobin-Arp Manufacturing Company, Eden Prairie, Minn.

[21] Appl. No.: 576,910

[22] Filed: Feb. 3, 1984

[51] Int. Cl.⁴ ............................................. B23B 39/00
[52] U.S. Cl. .................................................. 408/111
[58] Field of Search .................. 408/708, 111, 54, 72, 408/75

[56] References Cited

U.S. PATENT DOCUMENTS 1,905,819  4/1933  Doyle ............................. 408/111 X
4,090,805  5/1978  Grimsley ............................. 408/111

Primary Examiner—Eugene F. Desmond
Attorney, Agent, or Firm—Kinney & Lange

[57] ABSTRACT

A feed attachment for controlling the axial movement of a rotatable boring bar relative to a workpiece. The feed attachment includes a split clamp selectively secured to the boring bar for rotation with the boring bar about its axis. A collar is rotatably mounted concentrically with respect to the split clamp by a bearing which permits the collar to rotate about the axis independently of the boring bar and split clamp. A plate threadably engages the collar one one one side thereof and nonrotatably engages a workpiece on the other side thereof. The collar and plate are threadably engaged so that rotation of the collar moves the collar, base portion, and boring bar axially with respect to the plate and the workpiece. The plate is adaptable to nonrotatably engage workpieces of differing surface configurations.

12 Claims, 4 Drawing Figures 4,573,837

LONGITUDINAL FEED ATTACHMENT FOR A BORING BAR

BACKGROUND OF THE INVENTION

1. Field of the Invention

The present invention relates to apparatus for controlling axial movement of a rotating member, and specifically to a feed attachment for controlling and limiting the axial movement of a rotatable boring bar relative to a workpiece.

2. Description of the Prior Art

In many operations, it is necessary to very carefully control the axial movement of a rotatable boring bar relative to a workpiece. For example, the annular sides of the supports for cam shaft bearings on an engine block need to be precisely machined or faced. Such machining is typically done with a boring machine. The engine block is mounted on the boring machine and a rotatable boring bar is extended through the cam shaft bearing openings on the engine block. The necessary facing or boring tools are mounted on the boring bar to be rotated and engage the workpiece for facing or boring adjacent the openings. One such boring machine is Model CB-2400, manufactured by the Tobin-Arp Manufacturing Company of Eden Prairie, Minn. Machines such as this Tobin-Arp machine can simultaneously face or bore a number of openings in a workpiece which are axially aligned.

There have been numerous attempts in the prior art to precisely control the axial movement of a rotatable tool bar relative to a workpiece. Examples of such devices are shown in the following U.S. Patents:

| U.S. Pat. No. | Patentee | Issue Date |
| --- | --- | --- |
| 1,882,689 | Albertson | 10/18/32 |
| 2,632,363 | Boyce et al. | 03/24/53 |
| 2,905,030 | Cogsdill | 09/22/59 |

The device of the Albertson patent is a valve seat boring tool which uses a hand operated depth control for the cutter. This depth control is merely a manually threaded feed that limits the amount of penetration of the cutter being used. The device of the Boyce et al. patent is an apparatus for installing valve seats. The extent of axial movement of this device is limited by a ring which is threadably mounted on the device and which engages a stationary portion of the device when the device is moved to install a valve seat. The device of the Cogsdill patent is a countersink drive device which has a micrometer type of arrangement for presetting the depth of the countersink in the workpiece. The depth control and limiting arrangements of these three patents, which are typical of the prior art, are dissimilar from structure and function from the feed attachment of the present invention. These devices are not designed for use where multiple surfaces are to be simultaneously worked, and are not suitable for use in a boring machine environment.

U.S. Pat. No. 1,848,725, granted to Johnson on Mar. 18, 1932 and U.S. Pat. No. 3,767,316, granted to Dumont, Jr. on Oct. 23, 1973, both show boring machine arrangements wherein a plurality of tools are fixed to a rotatable boring bar for simultaneously working several surfaces of the workpiece. Neither patent, however, shows or discloses an arrangement for controlling the axial movement of the rotatable boring bar relative to the workpiece by placing the feed attachment directly on a portion of the workpiece and aligned with the workpiece for controlling the axial movement of the rotatable boring bar relative to the workpiece.

The feed attachment of the present invention contacts a portion of the workpiece and clamps directly to the boring bar and is alignable with respect to the workpiece surface to be worked to attain greater precision in controlling the axial movement of the boring bar. In addition, the present invention is easily adjustable and is positioned conveniently for use adjacent the workpiece on the boring bar.

SUMMARY OF THE INVENTION

The present invention is a feed attachment for controlling the axial movement of a rotatable boring bar relative to a workpiece. The feed attachment comprises a base portion selectively secured to the boring bar for rotation therewith about the longitudinal axis of the bar. A collar is rotatably mounted concentrically with respect to the base portion by bearing means so that the collar rotates about the axis independently from the rotation of the boring bar and base portion. Means for nonrotatably engaging the workpiece are provided, with said workpiece engaging means having a reference surface for engaging a side surface of the workpiece and a threaded portion mating with a threaded portion on the collar. Rotation of the collar thereby causes movement of the collar, base portion and boring bar axially with respect to the workpiece engaging means and the workpiece.

In one preferred embodiment, the engaging means includes a stop surface for limiting movement of the collar axially toward the workpiece. Annular indicia means are provided for indicating linear movement of the boring bar relative to the workpiece as a function of radial movement of the collar relative to the engaging means. The workpiece engaging means preferably comprises a plate member bearing the reference surface on one side thereof and the threaded portion of the engaging means on the other side thereof. Pin means extend outwardly from the workpiece side of the plate member for engaging an upper surface of the workpiece and thereby limiting rotation of the plate member with respect to the boring bar and the workpiece. The pin means preferably comprises two pins extending from the workpiece side of the plate member, with one of the pins being fixedly secured to the plate member and the other pin extending through an arcuate slot in the plate member and being selectively securable in said slot.

The boring bar longitudinal feed attachment of the present invention overcomes the disadvantages of the prior art devices. Precision is enhanced because the feed attachment directly engages the workpiece and provides a workpiece datum point for controlling the axial movement of the rotatable boring bar relative to the workpiece. Additionally, the feed attachment is easily adjustable and is positioned for immediate access by an operator of a boring machine.

DETAILED DESCRIPTION OF THE PREFERRED EMBODIMENTS

Figure 1:
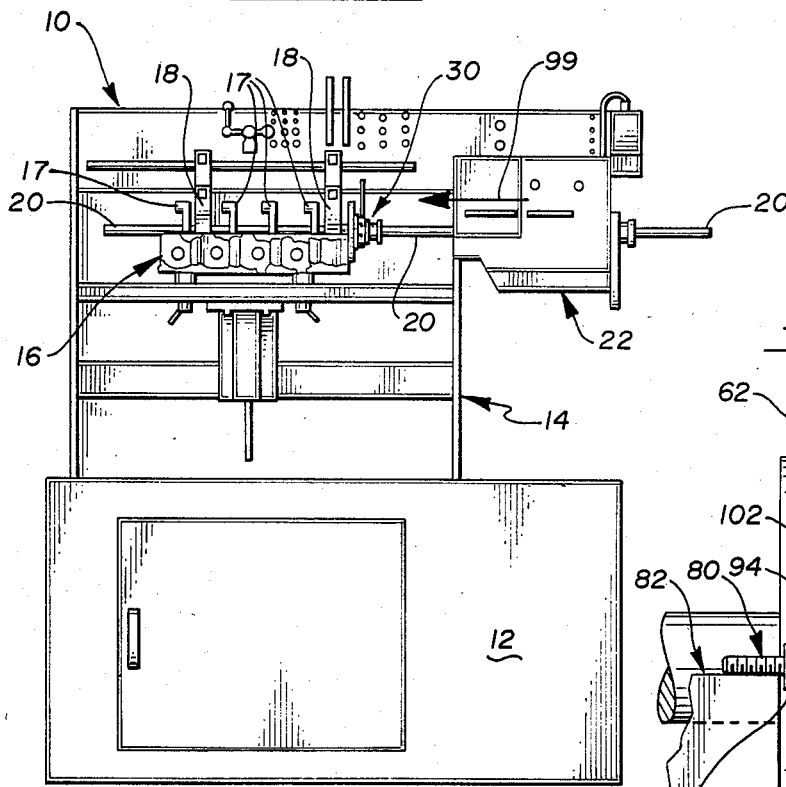
FIG. 1 is a front elevational view of a boring machine for boring cam shaft bearing seats with a longitudinal feed attachment of the present invention mounted thereon.

In FIG. 1, a cam shaft boring machine is generally illustrated at 10. The boring machine 10 has a base cabinet 12 and an upper support frame 14. A workpiece, typically an engine head 16 as shown, is firmly supported on the boring machine 10 by suitable portions of the support framework 14. The engine head 16 has a plurality of cam shaft support members 17 that extend upwardly when the engine head 16 is secured in place on the boring machine 10.

The frame 14 of the boring machine 10 has a plurality of bar support arms 18 supported thereon for mounting a boring bar 20 that passes through the arms 18 as shown. When secured in position on the support frame 14, the workpiece has at least one circular opening such as a cam shaft bearing seat through which the boring bar 20 axially extends. In the case of an engine head 16, the boring bar 20 extends concentrically through a plurality of axially aligned circular cam shaft openings in the cam shaft supports 17. The boring bar 20 extends concentrically through the cam shaft openings and typically has a cutter or facing tool secured thereon to engage portions of the engine head 16 adjacent each opening as the boring bar 20 is rotated. The tool is a boring or facing tool as desired.

The boring machine 10 includes a drive motor 22 for rotating the boring bar 20. The drive motor 22 also provides, as desired, means for moving the boring bar 20 axially with respect to the engine head 16. The boring bar 20 is axially movable to move the tools mounted thereon in direction of the boring bar axis with respect to the portion of the engine head 16 being worked.

Figure 2:
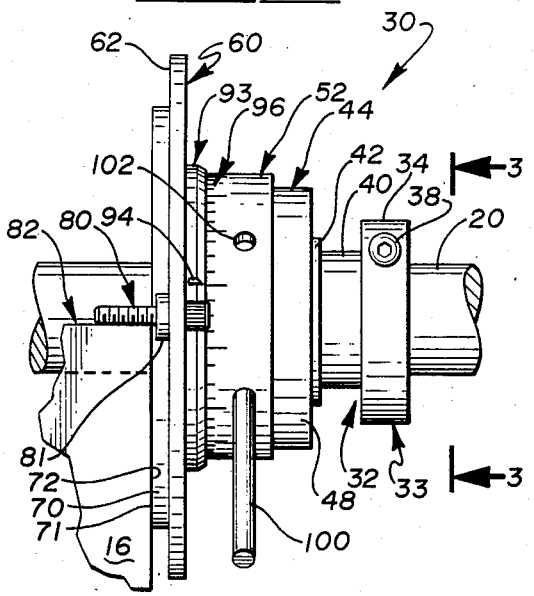
FIG. 2 is an enlarged front elevational view of the longitudinal feed attachment of the present invention, with some parts broken away.
Figure 3:
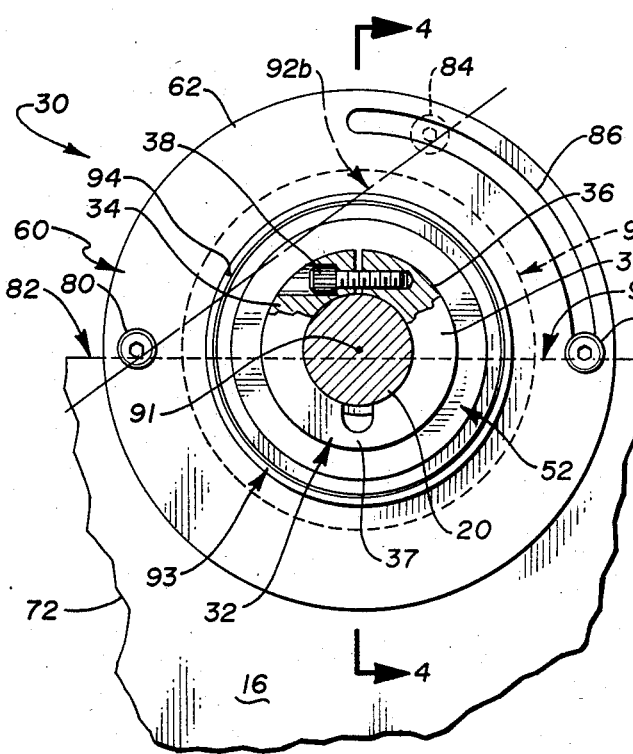
FIG. 3 is a sectional view taken along lines 3—3 in FIG. 2, with some parts additionally broken away and shown in section.
Figure 4:
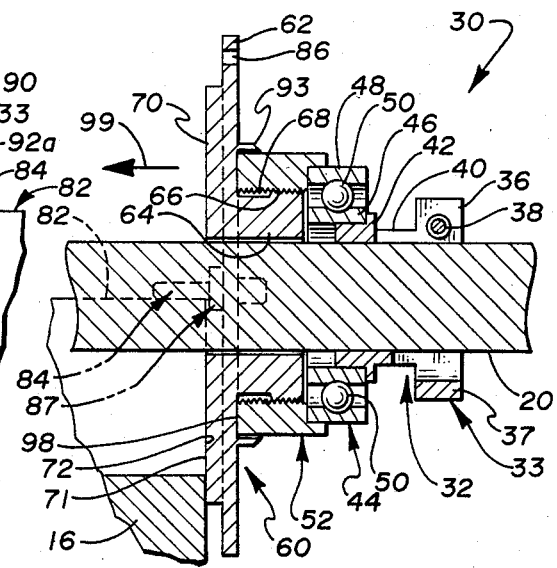
FIG. 4 is a sectional view as taken along lines 4—4 in FIG. 3.

In FIG. 1, a longitudinal feed attachment for the boring bar 20 is indicated generally at 30 in FIG. 1. As best shown in FIGS. 2-4, the feed attachment 30 has a base portion 32 which is selectively secured to the boring bar 20 for rotation therewith about the longitudinal axis of the boring bar 20. The base portion 32 preferably comprises a split clamp 33 which has first and second opposing portions 34 and 36 and a lateral cross-section mating generally with a lateral cross-section of the boring bar 20, as best shown in FIGS. 3 and 4. The first and second portions 34 and 36 are joined together as at 37 on one side of the boring bar, as best shown in FIG. 3. On the opposite side of the boring bar 20, fastening means such as a screw 38 selectively connect the first and second portions 34 and 36. When the screw 38 is loosened to permit separation of the first and second portions 34 and 36 of the split clamp 33, the base portion 32 is slidable longitudinally along the boring bar 20. However, when the screw 38 is tightened to urge the first and second portions 34 and 36 together, the first and second portions of the split clamp 33 securely grip the boring bar 20 so that the base portion 32 cannot move longitudinally with respect to the boring bar 20 (and rotates with the boring bar 20 about its axis). The longitudinal feed attachment 30 is thus selectively securable to the boring bar 20 at an infinite number of positions along its entire longitudinal length.

The base portion 32 has a sleeve 40 with a shoulder 42 longitudinally spaced from the split clamp 33, both the sleeve 40 and the shoulder 42 also being concentrically positioned about the boring bar 20. A bearing 44 has its inner race 46 secured to the shoulder 42 by a press fit or other suitable fastening means so that the inner race 46 is securely affixed with respect to the base portion 32. An outer race 48 of the bearing 44 is freely rotatable with respect to the inner race 46 and spaced therefrom by bearing means, such as a plurality of ball bearings 50. The outer race 48 is secured by press fit or other suitable fastening means to an annular longitudinal feed control collar 52. As shown, the collar 52 is rotatably mounted (via the bearing 44) concentrically with respect to the base portion 32. The collar 52 thus may rotate about the boring bar axis independently from rotation of the boring bar 20 and base portion 32.

The longitudinal feed attachment 30 also includes a feed alignment member 60. The member 60 is preferably comprised of a circular plate 62 which has a sleeve 64 extending from one side thereof, with both the plate 62 and the sleeve 64 being concentric about the boring bar 20 as shown. The sleeve 64 is externally threaded as at threaded portion 66 and the collar 52 is internally threaded as at threaded portion 68. These threaded portions 66 and 68 mate so that the collar 52 and the sleeve 64 are threaded together as best shown in FIG. 4 to be rotatable with respect to one another.

On the side of the plate 62 opposite the sleeve 64, the feed alignment member 60 has an annular shoulder 70 with a workpiece engaging reference surface 71 thereon. The longitudinal feed attachment 30 is positioned on the boring bar 20 so that the reference surface 71 on the shoulder 70 engages a side surface 72 of the engine head 16 being worked.

The feed alignment member 60 also has means for engaging the engine head 16 to prevent rotation of the member 60 with respect to the engine head 16. A first pin 80 extends outwardly from the reference surface 71 side of the member 60 which faces the engine head 16 as shown in FIG. 2. The first pin 80 is secured to the plate 62 of the member 60 by suitable means such as being held in a hole through plate 62 with a lock nut 81 as shown in FIG. 2.

The longitudinal feed attachment 30 is moved axially (to the left as viewed in FIG. 2) along the boring bar 20 so that the workpiece engaging reference surface 71 of the shoulder 70 of the member 60 engages the side surface 72 of the engine head 16. The pin 80 then extends past the side surface 72 of the engine head 16. Rotational movement of the member 60 (in a counterclockwise direction as viewed in FIG. 3) thus causes the pin 80 to engage an engaging surface 82 (typically either a top or bottom surface of the engine head) to limit rotation of the member 60 in that direction with respect to the engine head 16.

A second pin 84 (shown as a cap screw) also extends outwardly from the reference surface 71 side of the member 60 toward the engine head 16. The second pin 84 is selectively secureable along the length of an axial alignment slot 86 adjacent the periphery of the plate 62. The alignment slot 86 is preferably an arcuate slot about the longitudinal axis of the boring bar 20 as show in FIG. 3. The slot 86 extends through the plate 62 along about a ninety degree arc thereof. The pin 84 is securable in the slot 86 by suitable and selectively releaseable fastening means such as a lock nut 87 that tightens down to hold the pin 84 in a selected position.

The first pin 80 is fixedly secured to the plate 62 while the second pin 84 is movably secured to the plate 62 through an arc of ninety degrees. The second pin 84 can thus be loosened and moved along the slot 86 to a desired portion before being tightened. The second pin also will rest on surface 82 of the engine head 16 when in use. The second pin 84 may be moved in slot 82 to a position such as illustrated in FIGS. 3 and 4. Once in its desired position, the second pin 84 is fixedly secured with respect to slot 86 in the plate 62 so that when both pins 80 and 84 rest on the surface 82, rotation of the feed alignment member 60 is prevented with respect to the engine head 16 in both clockwise and counterclockwise directions about the axis of the boring bar 20. The first and second pins 80 and 84 are thus rotation limit pins which prevent the member 60 from rotating relative to the engine head 16.

The slot 86 is provided in the plate 62 to accommodate different configurations of workpieces. The distance from the surface 82 of the workpiece, which is engaged by the first and second pins 80 and 84, to the axis of the bearing seats being worked on will vary for different parts. By way of illustration, the circular opening (bore adjacent a bearing seat being worked on) indicated as at 90 in phantom in FIG. 3 has its axis (indicated by reference character 91) proximate to a support plane 92a defined by the edges of pins 80 and 84 engaging plane surface 82 of the engine head 16 (see FIG. 3). The tool has to rotate concentric with the bore 90 being worked on. Thus, adjustment of the pins 80 permits spacing the axis of the boring bar 20 at different distances from the support plane defined by pins 80 and 84. The support plane indicated at 92b, which is defined when pin 84 is in its dotted position in FIG. 3, is spaced substantially farther from the axis 91 of the bore 90 and boring bar axis than support plane 92a. In other instances, the engaging surface 82 of the engine head 16 may be uneven (not planar), necessitating the realignment of the second pin 84 in the slot 86 to nonrotatably support the member 60 with respect to the engine head 16. The member 62 may be rotated 180° so pin 84 would be to the left in FIG. 3. Then with the pin 84 in dotted position the support plane of pins 80 and 84 would be on the opposite sides of the pins from support plane 92b and the axis 91 would be a substantial distance above the support surface. Thus, if the center of the bearing bore 90 is above the support plane of the engine head, the feed attachment 30 may be adapted to be used.

Rotation of the collar 52 with respect to member 60 causes the collar 52 to move longitudinally with respect to the member 60 (via cooperative action by the threaded portions 66 and 68). Since the base portion 32 is secured by the bearing 44 for longitudinal movement to the collar 52, and the boring bar 20 is, in turn, secured to the base portion 32, rotation of the collar 52 moves the collar 52, base portion 32 and boring bar 20 axially with respect to the feed alignment member 60. The member 60 cannot rotate with respect to the engine head 16 because of the pins 80 and 84 or move longitudinally toward the engine head 16 because of the abutting of reference surface 71 and side surface 72.

The plate 62 of the feed alignment member 60 also has a movement indicia sleeve 93 secured thereto to extend concentrically about a portion of the sleeve 64. The indicia sleeve 93 has at least one visible support indicator mark thereon, such as notch 94 shown in FIG. 2. The collar 52 has a plurality of uniformly spaced indicator marks as at 96 visible about its exterior, as also shown in FIG. 2. The notch 94 and indicator marks 96 thus provide annular indicia means cooperatively positioned on the sleeve 93 and collar 52 for indicating linear movement of the collar 52 relative to the sleeve 93 (and member 60) as a function of rotational movement of the collar 52 relative to the sleeve 93. The indicator marks 96 are spaced about the collar 52 to correspond proportionally to desired distances through which the collar 52 moves longitudinally with respect to the member 60. Of course, movement of the collar 52 longitudinally also moves the boring bar 20 longitudinally when the split clamp 33 of the base portion 32 is secured thereto. Axial movement of the collar 52 in direction toward the engine head 16 is limited by a stop surface 98 on the collar 52 which engages the plate 62.

The feed alignment member 60 thus comprises means for controlling the longitudinal feed of the boring bar 20 with respect to the engine head 16. In operation, the longitudinal feed attachment is positioned concentrically about the boring bar 20 and moved longitudinally along the bar 20 until the workpiece engaging reference surface 71 of the shoulder 70 abuts the side surface 72 of the engine head 16. The plate 62 is then rotated so that either the first pin 80 or second pin 84 engages a portion of the engaging surface 82 of the engine head 16. For securing the plate 63 so that it will not rotate clockwise or counterclockwise with respect to the engine head 16, both pins 80 and 84 are positioned to engage the surface 82. The second pin 84 is abutted on the surface 82 and secured with respect to the axial alignment slot 86 so that it also rests on a portion of the the engaging surface 82 of the engine head 16. The member 60 is thus nonrotatably positioned with respect to the engine head 16.

The boring bar 20 is then moved longitudinally to a desired prework position with respect to the cam bore housing of the engine head 16 to be worked and the screw 38 is tightened so that the split clamp 33 of the base portion 32 is secured to the boring bar 20. The boring bar 20 is now rotated by drive motor 22. The tool thereon does not yet engage or just touches the face of the workpiece when in this prework position, however. Proper rotation of the collar 52 moves the boring bar 20 and tool mounted thereon axially (to the left as viewed in FIGS. 1 and 4, and as further indicated by arrow 99) with respect to the engine head 16 and surface to be worked to a workpiece engaging position. Thus, for facing a portion of the cam support shaft member 17 of the engine head 16 adjacent its circular opening, the collar 52 is rotated relative to the member 60 to move the boring bar 20 a desired distance in direction of the boring bar axis to engage the facing tool with the surface to be faced and work to a desired depth.

Rotation of the collar 52 with respect to the feed alignment member 60 is facilitated by a removable handle 100 which is securable in any one of a plurality of annularly spaced apertures 102 in the collar 52. The handle 100 can be positioned in the aperture 102 which is most convenient for the operator.

Rotation of the collar 52 causes the mated threaded portions 66 and 68 to engage and rotate relative to one another to move the collar 52 and boring bar 20 in direction shown by the arrow 99 in FIGS. 1 and 4. An operator can control the extent of longitudinal movement of the boring bar 20 by observing the relationship of the notch 94 on the indicia sleeve 93 and indicator marks 96 on the collar 52.

The cam shaft boring machine 10 typically has a power feed thereon which uses air pressure for feeding the boring bar 20 axially in direction as shown by arrow 99 for a normal boring operation. The longitudinal feed attachment 30 of the present invention can be used in conjunction with this powered axial feed, but will only feed the boring bar 20 in direction toward the surface to be worked as far as permited by rotation of the sleeve 52 with respect to the feed alignment member 60. Once the plate 62 engages the stop surface 98 of the collar 52, the boring bar 20 will no longer move toward the engine head 16. In other words, this power feed feature urges the feed alignment member 60 against the side surface 72 of the engine head 16, with the rotation of the sleeve 52 controlling the extent of longitudinal movement of the boring bar 20 with respect to the engine head 16.

The longitudinal feed attachment of the present invention provides precise means for controlling the longitudinal movement of a boring bar. The feed attachment is aligned longitudinal to the workpiece directly by abutting a reference surface on the feed attachment with respect to a surface on the workpiece and not with respect to some artificial datum point. Thus, any axial movement of the boring bar with respect to the workpiece is measured from a fixed reference point (side surface) of the workpiece. This permits greater precision in the machining of the workpiece, while reducing set up times and operator control times.

Although the present invention has been described with reference to preferred embodiments, workers skilled in the art will recognize that changes may be made in form and detail without departing from the spirit and scope of the invention.

What is claimed is:

1. A feed attachment for controlling the axial movement of a rotatable boring bar relative to a workpiece, the feed attachment comprising:
   a base portion selectively secured to the bar for rotation therewith about the longitudinal axis of the bar;
   a collar rotatably mounted concentrically with respect to the base portion so that the collar rotates about the axis independently from the rotation of the bar and base portion, the collar having a threaded portion thereon;
   a workpiece engagement member having a reference surface on one side thereof for nonfixedly engaging a side surface of the workpiece and bearing a threaded portion on an opposite sude thereof which mates with the threaded portion of the collar; and
   pin means extending outwardly from said one side of the engagement member for nonfixedly engaging an upper surface of the workpiece to limit rotation of the plate member with respect to the bar and workpiece and so that rotation of the collar moves the collar, base portion and bar axially with respect to said engaging means and the workpiece.

2. The feed attachment of claim 1 wherein the base portion comprises a split clamp having means for tightening the split clamp to secure it to the bar.

3. The feed attachment of claim 1 wherein the collar includes a stop surface for engaging the workpiece engagement member to limit movement of the collar axially toward the workpiece.

4. The feed attachment of claim 1, and further comprising:
   annular indicia means cooperatively positioned on the collar and workpiece engagement member for indicating linear movement of the bar relative to the workpiece as a function of rotational movement of the collar relative to the workpiece engagement member.

5. The feed attachment of claim 1 wherein the collar has handle means for rotating the collar relative to the workpiece engagement member.

6. A feed attachment for controlling the axial movement of a rotatable boring bar relative to a workpiece, the feed attachment comprising:
   a base portion selectively secured to the bar for rotation therewith about the longitudinal axis of the bar;
   a collar rotatably mounted concentrically with respect to the base portion so that the collar rotates about the axis independently from the rotation of the bar and base portion, the collar having a threaded portion thereon;
   a plate member having a reference surface on one side thereof for engaging a side surface of the workpiece and bearing a threaded portion on the other side thereof which mates with the threaded portion of the collar; and
   two pins extending from the reference surface side of the plate member for engaging an upper surface of the workpiece to limit rotation of the plate member with respect to the bar and workpiece and so that rotation of the collar moves the collar, base portion and bar axially with respect to said plate member and the workpiece, with one of the pins being fixedly secured to the plate member and the other pin extending through an arcuate slot in the plate member and being selectively securable in said slot.

7. The feed attachment of claim 6 wherein the base portion comprises a split clamp having means for tightening the split clamp to secure it to the bar.

8. The feed attachment of claim 6, and further comprising:
   annular indicia means cooperatively positioned on the collar and plate member for indicating linear movement of the bar relative to the workpiece as a function of rotational movement of the collar relative to the plate member.

9. The feed attachment of claim 6 wherein the collar has handle means for rotating the collar relative to the plate member.

10. A feed attachment for controlling the axial movement of a rotatable boring bar relative to a workpiece, the feed attachment comprising:
    a base portion selectively secured to the boring bar for rotation therewith about the longitudinal axis of the boring bar;
    a collar rotatably mounted with respect to the base portion so that the collar rotates about the axis independently from the bar and base portion;
    an alignment member having a reference surface for engaging a side surface of the workpiece and means for nonrotatably engaging the workpiece with the alignment member being nonfixedly engaged with respect to the workpiece; and
    coupling means for rotatably coupling the collar and alignment member so that rotation of the collar with respect to the alignment member causes axial movement of the boring bar with respect to the workpiece.

11. The feed attachment of claim 10 wherein the alignment member comprises:
   a plate member rotatably coupled to the collar on one side thereof and having the reference surface on the other side thereof; and
   pin means extending from the reference surface side of the plate member for nonfixedly, engaging a top surface of the workpiece to limit rotation of the plate member with respect to the workpiece.

12. The feed attachment of claim 11, and further comprising:
   means for adjusting the position of the pin means relative to the plate member to permit use of the feed attachment on workpieces of differing configurations.

* * * * *

UNITED STATES PATENT AND TRADEMARK OFFICE
CERTIFICATE OF CORRECTION

PATENT NO. : 4,573,837

DATED : March 4, 1986

INVENTOR(S) : James F. Flaten

It is certified that error appears in the above-identified patent and that said Letters Patent is hereby corrected as shown below:

Column 7, line 50, "sude" should be -- side --.

Signed and Sealed this

Tenth Day of June 1986

[SEAL]

Attest:

DONALD J. QUIGG

Attesting Officer     Commissioner of Patents and Trademarks